United States Patent [19]
Moskovich

[11] Patent Number: 6,094,311
[45] Date of Patent: Jul. 25, 2000

[54] LCD PROJECTION LENS

[75] Inventor: Jacob Moskovich, Cincinnati, Ohio

[73] Assignee: U.S. Precision Lens Inc., Cincinnati, Ohio

[21] Appl. No.: 09/171,838
[22] PCT Filed: Apr. 28, 1997
[86] PCT No.: PCT/US97/07686
  § 371 Date: Oct. 27, 1998
  § 102(e) Date: Oct. 27, 1998
[87] PCT Pub. No.: WO97/41461
  PCT Pub. Date: Nov. 6, 1997

Related U.S. Application Data

[60] Provisional application No. 60/016,447, Apr. 29, 1996.

[51] Int. Cl.$^7$ ................................ G02B 3/00; G02B 9/06
[52] U.S. Cl. ..................... 359/651; 359/717; 359/740; 359/794
[58] Field of Search ........................... 359/649–651, 359/740, 794, 717

[56] References Cited

U.S. PATENT DOCUMENTS

| | | | |
|---|---|---|---|
| 2,346,062 | 4/1944 | Altman | 359/649 |
| 2,380,210 | 7/1945 | Bennett | 359/649 |
| 3,603,676 | 9/1971 | Loewe | 359/649 |
| 4,013,346 | 3/1977 | Matsubara . | |
| 4,454,535 | 6/1984 | Machida | 359/649 |
| 4,573,769 | 3/1986 | Clarke | 359/649 |
| 4,682,862 | 7/1987 | Moskovich | 359/649 |
| 4,776,681 | 10/1988 | Moskovich . | |
| 4,933,599 | 6/1990 | Fukuda | 359/649 |
| 5,066,113 | 11/1991 | Nakajima et al. | 359/649 |
| 5,200,861 | 4/1993 | Moskovich | 359/662 |
| 5,218,480 | 6/1993 | Moskovich | 359/753 |
| 5,388,003 | 2/1995 | Naganuma et al. | 359/649 |
| 5,600,488 | 2/1997 | Minefuji et al. | 359/651 |
| 5,625,495 | 4/1997 | Moskovich | 359/663 |
| 5,677,798 | 10/1997 | Hirano et al. | 359/717 |
| 5,699,195 | 12/1997 | Brewis | 359/649 |
| 5,870,228 | 2/1999 | Kreitzer et al. | 359/649 |
| 5,900,987 | 5/1999 | Kreitzer | 359/649 |
| 5,900,989 | 5/1999 | Kreitzer | 359/691 |
| 5,963,375 | 10/1999 | Kreitzer | 359/650 |

*Primary Examiner*—Georgia Epps
*Assistant Examiner*—Evelyn A. Lester
*Attorney, Agent, or Firm*—Maurice M. Klee

[57] ABSTRACT

A projection lens for use with a pixelized panel (LCD) is provided. The lens has two positive lens units with an aperture stop between them. The optical powers of each of the units are such that f1 is substantially shorter than f2, where f1 and f2 are the focal lengths of the first lens unit and the second lens unit, respectively, the first lens unit being on the system's long conjugate side and the second lens unit being on the short conjugate side. The ratio of f1 to f2 is preferably less than about 0.75.

16 Claims, 7 Drawing Sheets

LCD PROJECTION LENS

CROSS REFERENCE TO RELATED PROVISIONAL APPLICATION

This application claims the benefit under 35 USC §119(e) of U.S. Provisional Application No. 60/016,447 filed Apr. 29, 1996 the content of which in its entirety is hereby incorporated by reference.

FIELD OF THE INVENTION

This invention relates to projection lenses and, in particular, to projection lenses which can be used, inter alia, to form an image of an object composed of pixels, such as, a liquid crystal display (LCD).

BACKGROUND OF THE INVENTION

Projection lens systems (also referred to herein as "projection systems") are used to form an image of an object on a viewing screen. The basic structure of such a system is shown in FIG. 7, wherein 10 is a light source (e.g., a tungsten-halogen lamp), 12 is illumination optics which forms an image of the light source (hereinafter referred to as the "output" of the illumination system), 14 is the object which is to be projected (e.g., a matrix of on and off pixels of a LCD panel), and 13 is a projection lens, composed of multiple lens elements, which forms an enlarged image of object 14 on viewing screen 16.

Projection lens systems in which the object is a LCD or other pixelized panel are used in a variety of applications, including data display systems. Such projection lens systems preferably employ a single projection lens which forms an image of either a single panel having, for example, red, green, and blue pixels, or three individual panels, one for each color. For ease of reference, the following discussion will be in terms of a projection lens system that employs a single LCD panel, it being understood that the invention can also be used in systems which employ multiple panels and/or other types of pixelization.

SUMMARY OF THE INVENTION

The projection lenses of the invention comprise two positive lens units with an aperture stop between them. The optical powers of each of the units are such that f1 is substantially shorter than f2, where f1 and f2 are the focal lengths of the first lens unit and the second lens unit, respectively, the first lens unit being on the system's long conjugate side and the second lens unit being on the short conjugate side. In particular, the ratio of f1 to f2 is less than about 0.75. (See Table 7 and note that when the second unit includes a field lens, e.g., a Fresnel field lens, the value of f2 is calculated without the field lens.) In contrast, for a classical double gauss form, f1 is about the same as f2, or longer than f2.

The projection lenses of the invention are capable of covering a wide field of view. They have a back focal length approximately equal to the focal length of the lens. Each of the first and second lens units has at least one aspherical surface.

The first lens unit on the long conjugate side of the stop may consist of a single positive element. However, to obtain a better correction of residual astigmatism and chromatic aberrations, this unit may include a leading negative element closely followed by a positive component which may be a color correcting doublet. As illustrated in Tables 1–5, the spacing between the leading negative element and the positive component is at most about 5% of the focal length of the first lens unit.

The second lens unit behind the aperture stop includes a color correcting doublet and a single positive element with at least one aspherical surface. Most of the correction of spherical aberration is obtained in the first lens unit, while off-axis aberrations including coma and distortion, as well as chromatic aberrations, are corrected predominantly in the second lens unit.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

Figure 1:
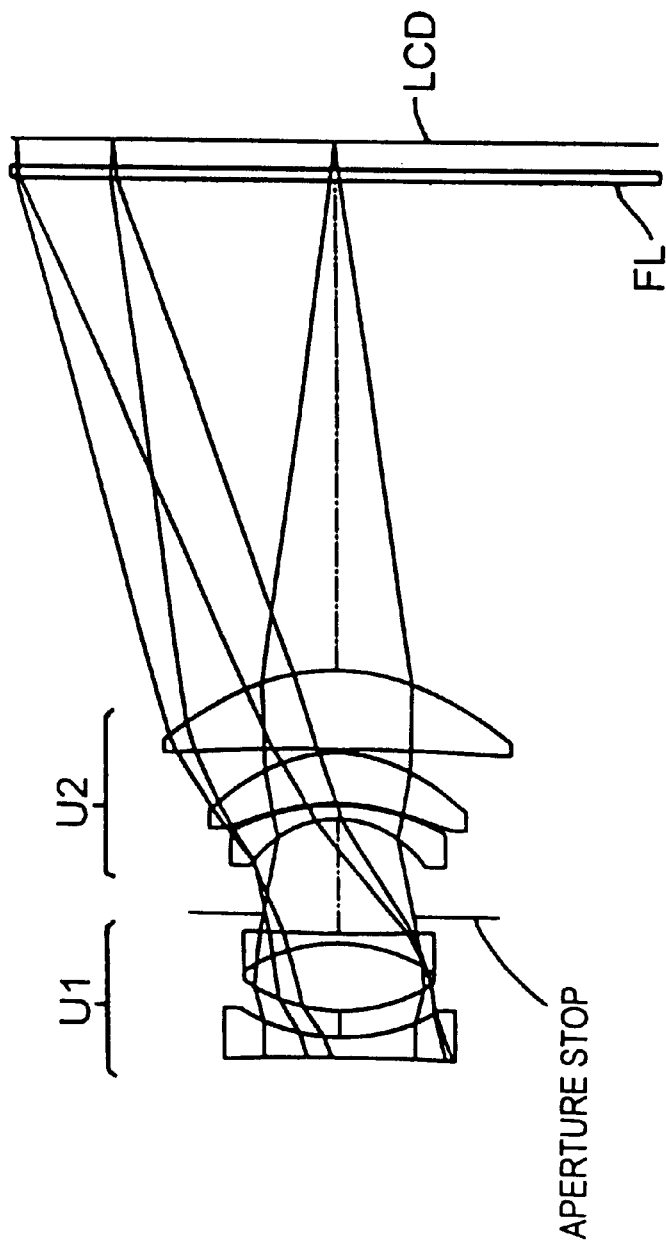
FIGS. 1–6 are schematic side views of projection lenses constructed in accordance with the invention.
Figure 2:
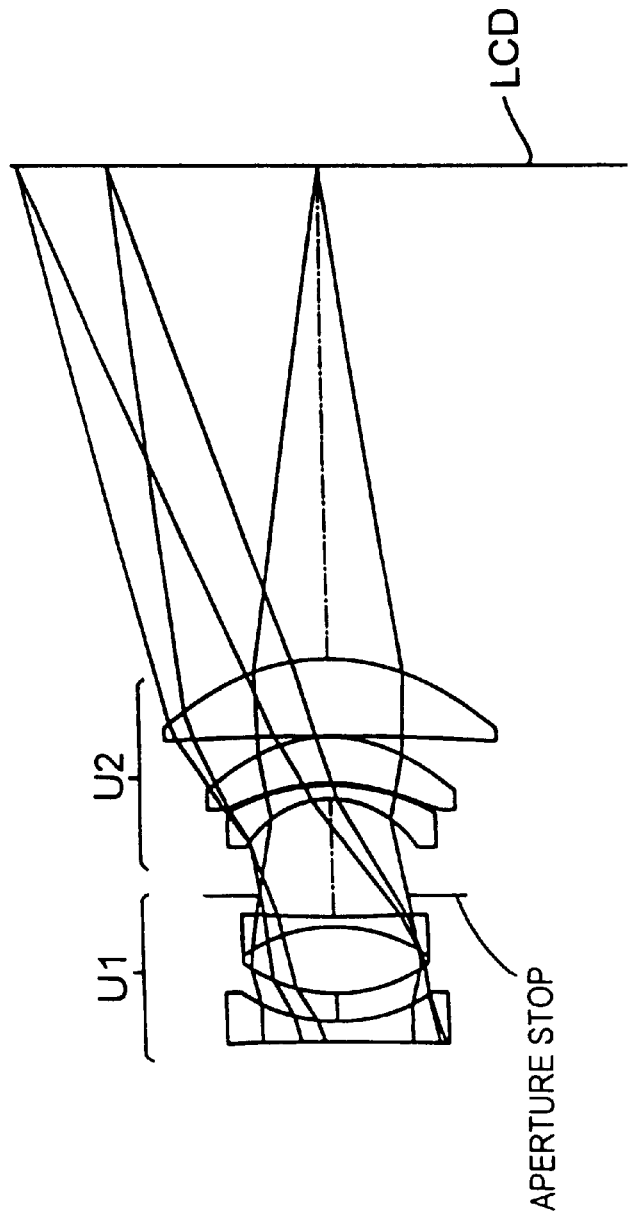
Figure 3:
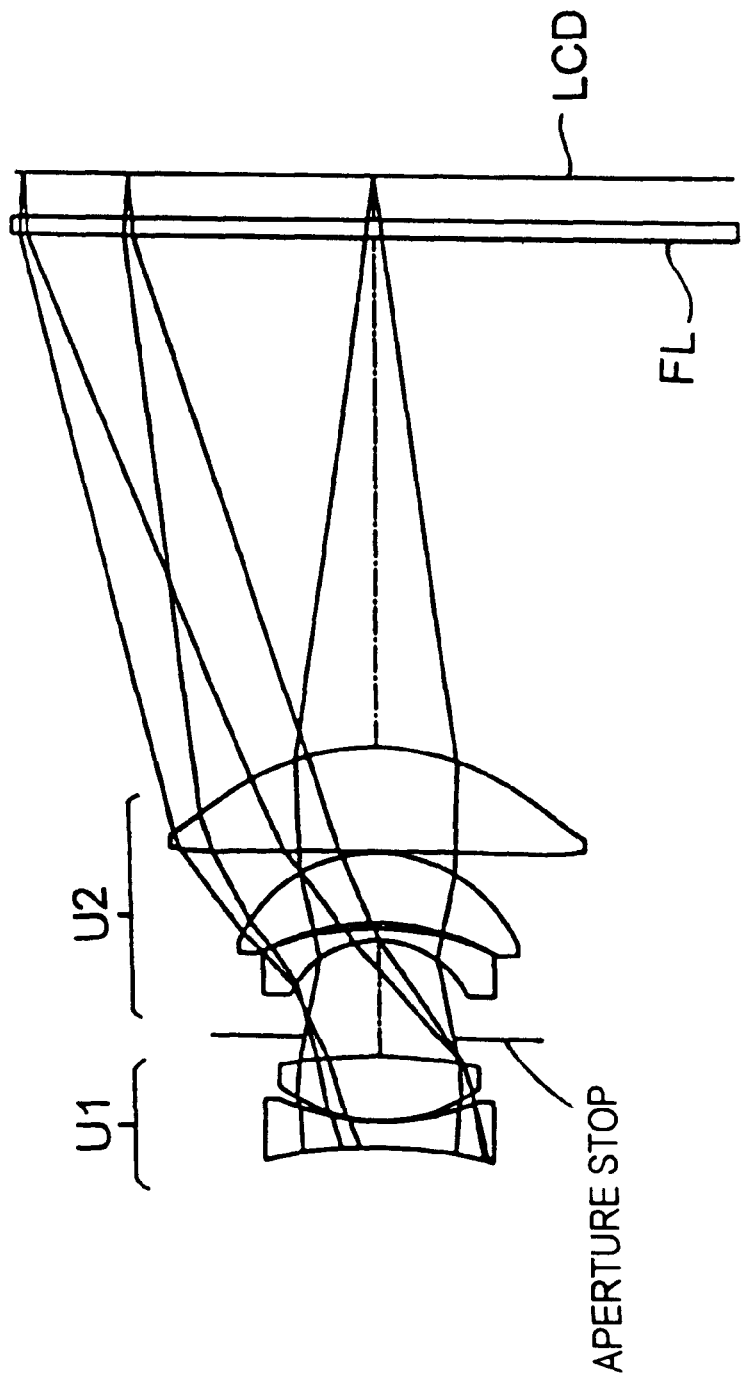
Figure 4:
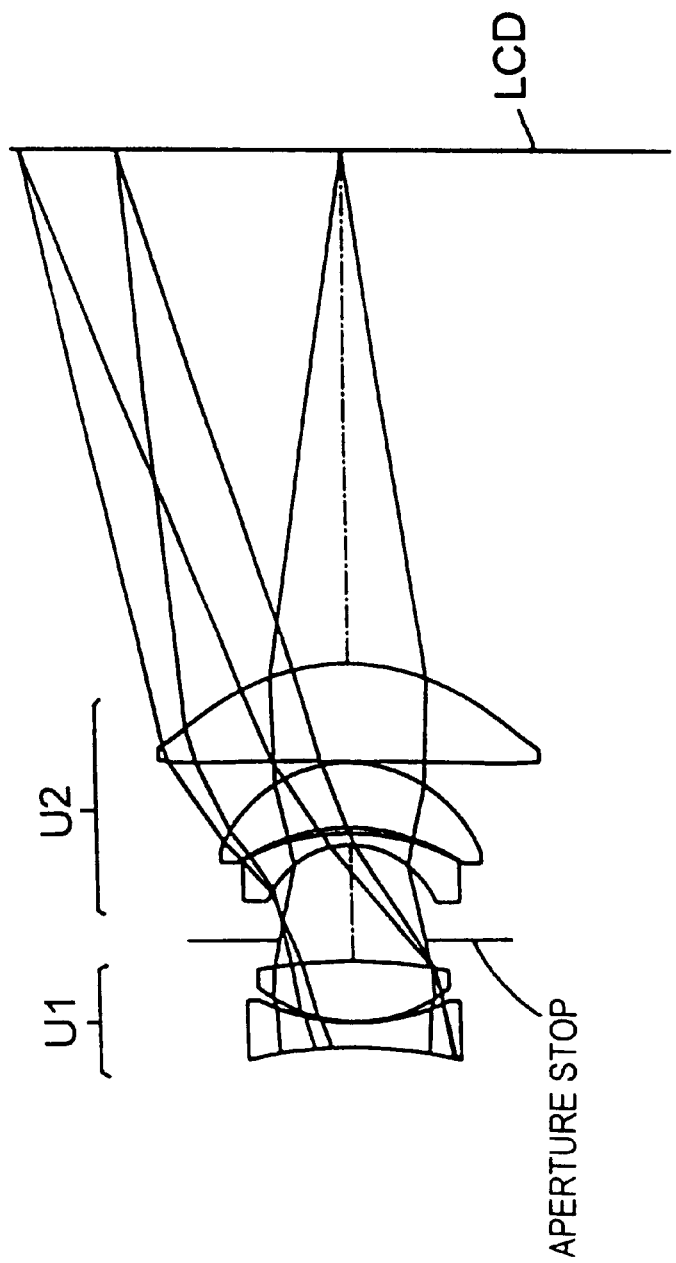
Figure 5:
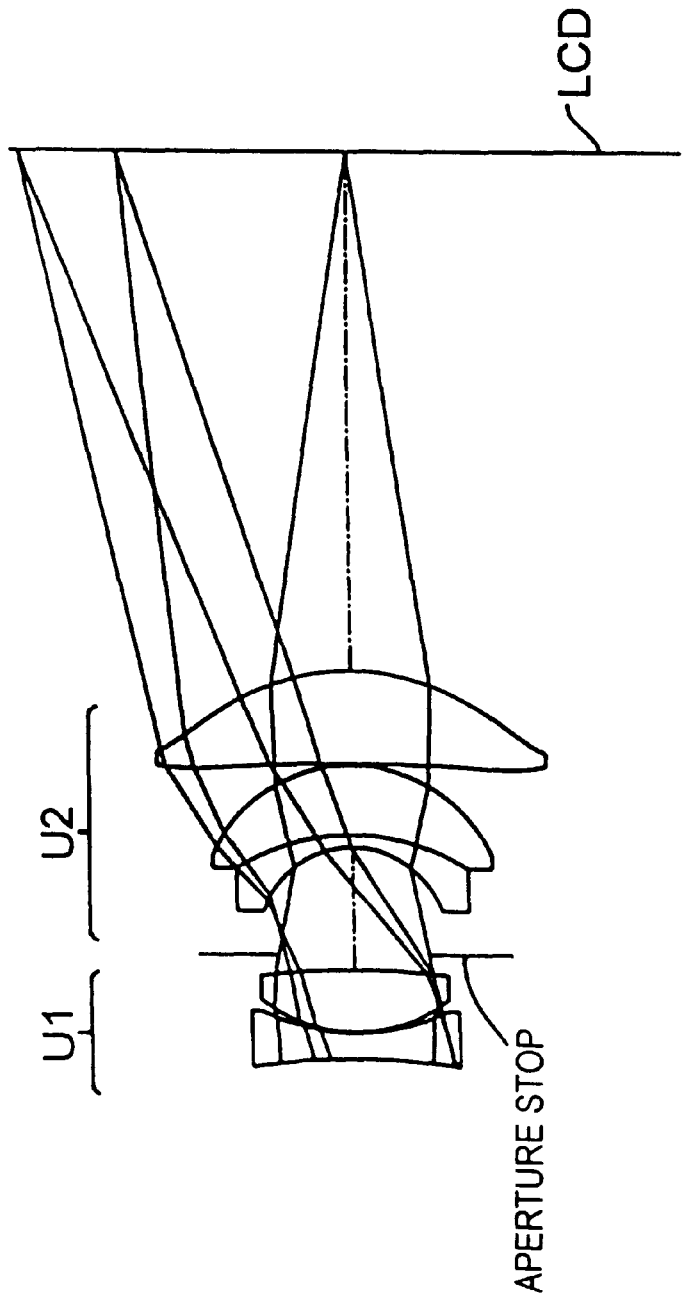
Figure 6:
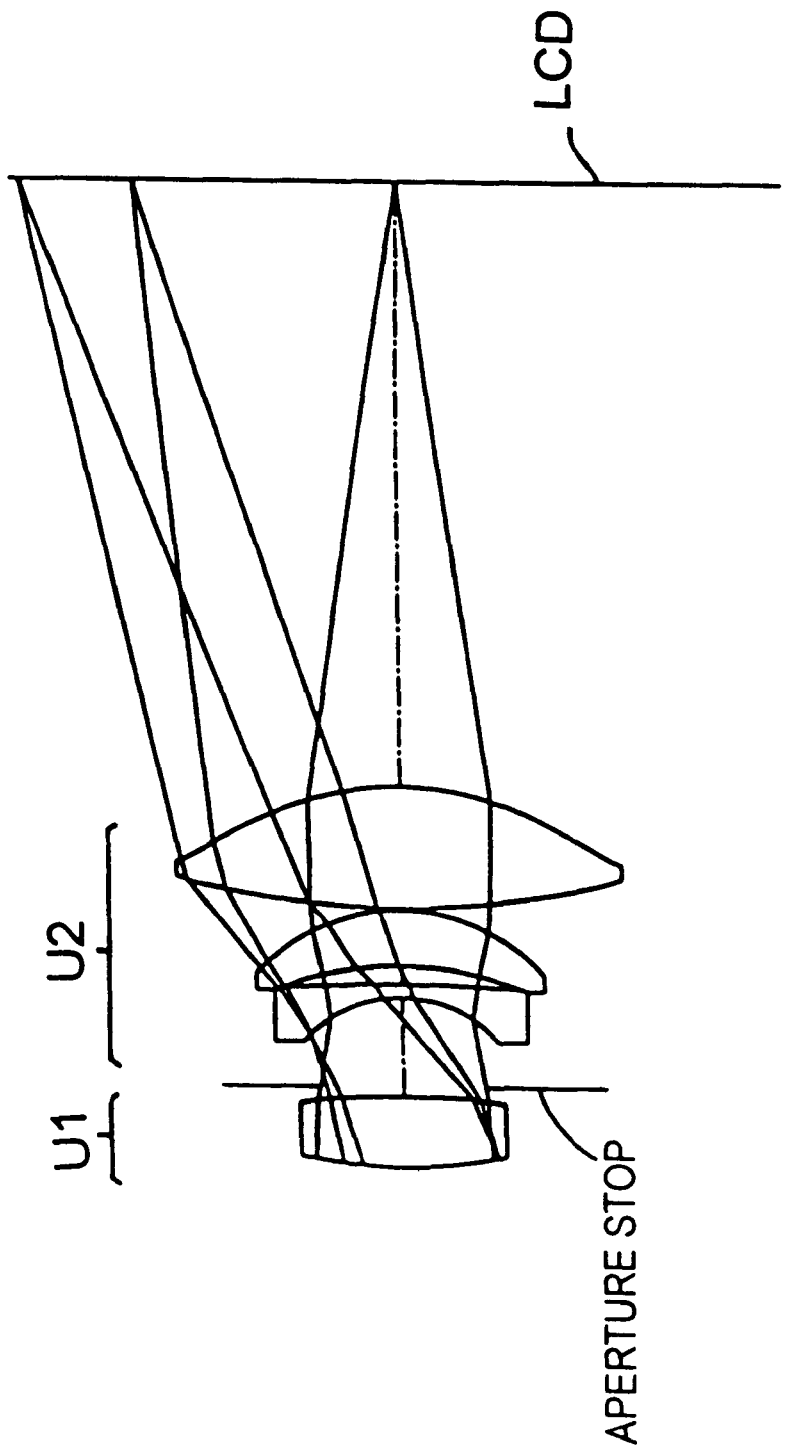
Figure 7:
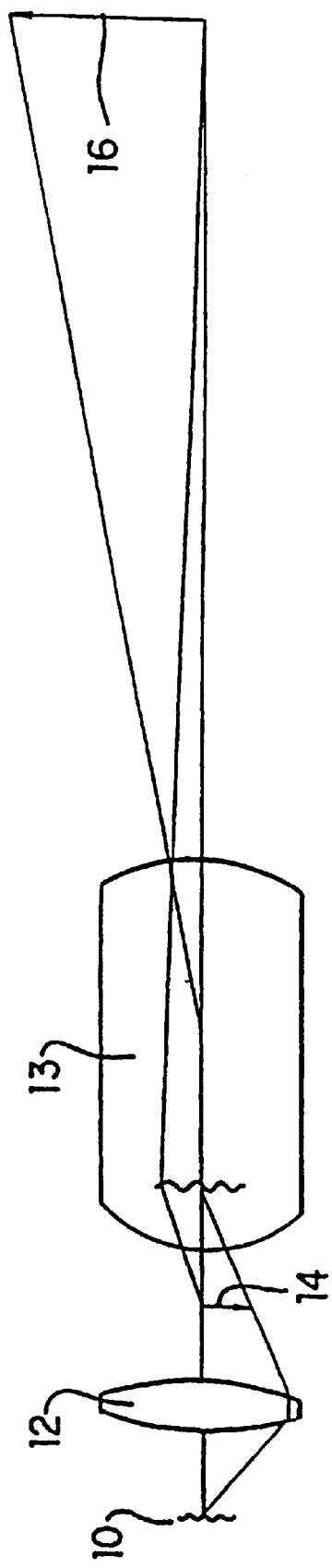
FIG. 7 is a schematic diagram showing an overall projection lens system in which the projection lens of the present invention can be used.

FIGS. 1 to 6 illustrate various projection lenses constructed in accordance with the invention. Corresponding prescriptions and optical properties appear in Tables 1 to 6, respectively. The correspondence between the lens units discussed above and the various elements and surfaces of the lenses of Tables 1–6 is set forth in Table 7.

HOYA or SCHOTT designations are used for the glasses employed in the lens systems. Equivalent glasses made by other manufacturers can be used in the practice of the invention. Industry acceptable materials are used for the styrene and acrylic elements.

The aspheric coefficients set forth in the tables are for use in the following equation:

$$z = \frac{cy^2}{1 + [1 - (1+k)\ c^2 y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant.

The designation "a" associated with various surfaces in the tables represents an aspheric surface, i.e., a surface for which at least one of D, E, F, G, H, or I in the above equation is not zero. The designation "c" represents a conic surface for which the k value in the above equation is not zero. The designation "f" represents a Fresnel lens surface (the Fresnel lens is identified by the designation "FL" in FIGS. 1 and 3). All dimensions given in the tables are in millimeters. The tables are constructed on the assumption that light travels from left to right in the figures. In actual practice, the viewing screen will be on the left and the LCD panel will be on the right, and light will travel from right to left.

Although specific embodiments of the invention have been described and illustrated, it is to be understood that a variety of modifications which do not depart from the scope and spirit of the invention will be evident to persons of ordinary skill in the art from the foregoing disclosure.

TABLE 1

Lens Data

| Surf. No. | Type | Radius | Thickness | Glass | Clear Aperture Diameter |
|---|---|---|---|---|---|
| 1 | a | −1770.1750 | 8.00000 | ACRYLIC | 84.11 |
| 2 | a | 72.5195 | 10.00000 | | 71.77 |
| 3 | | 63.3660 | 25.00000 | SK18 | 68.98 |
| 4 | | −63.3660 | 4.00000 | KF6 | 65.89 |
| 5 | | 762.9749 | 9.16228 | | 60.48 |
| 6 | | Aperture stop | 35.18800 | | 57.72 |
| 7 | | −38.4192 | 5.00000 | SF14 | 63.38 |
| 8 | | −81.9407 | 1.00000 | | 80.13 |
| 9 | a | −77.4031 | 18.00000 | ACRYLIC | 83.60 |
| 10 | a | −57.0000 | Space 1 | | 93.65 |
| 11 | c | −927.4539 | 29.50000 | ACRYLIC | 119.77 |
| 12 | a | −79.0000 | Space 2 | | 124.99 |
| 13 | cf | 185.6000 | 4.00000 | ACRYLIC | 237.06 |
| 14 | | ∞ | Image distance | | 236.86 |

Symbol Description a — Polynomial asphere
c — Conic section
f — Fresnel

Conics

| Surface Number | Constant |
|---|---|
| 11 | −7.1739E+01 |
| 13 | −1.7000E+00 |

Even Polynomial Aspheres

| Surf. No. | D | E | F | G | H | I |
|---|---|---|---|---|---|---|
| 1 | −7.0051E−08 | −6.3254E−12 | −2.9530E−14 | 7.5364E−19 | 9.4792E−21 | −3.0013E−24 |
| 2 | 7.7762E−08 | 1.2679E−11 | 1.0260E−13 | −3.2966E−17 | −1.6803E−21 | 1.6991E−23 |
| 9 | 4.1171E−07 | 2.1244E−10 | 1.0122E−14 | 4.0619E−18 | 4.4932E−21 | −1.0666E−24 |
| 10 | 2.4362E−07 | 1.2454E−10 | 1.2955E−14 | 1.0067E−17 | 1.8340E−21 | 3.0151E−24 |
| 12 | 1.3759E−07 | 5.0414E−11 | −2.7910E−15 | 1.1423E−18 | 3.9343E−23 | −3.3950E−27 |

Variable Spaces

| Zoom Pos. | Space 1 T(10) | Space 2 T(12) | Focal Shift | Image Distance |
|---|---|---|---|---|
| 1 | 1.500 | 182.411 | −1.425 | 10.021 |
| 2 | 0.500 | 190.200 | −1.000 | 10.015 |
| 3 | 2.000 | 175.350 | −1.800 | 10.013 |

First-Order Data

| | Zoom Position | | |
|---|---|---|---|
| | 1 | 2 | 3 |
| f/number | 3.50 | 3.50 | 3.50 |
| Magnification | −0.0645 | −0.1000 | −0.0322 |
| Object Height | −1830.8 | −1180.0 | −3660.0 |
| Object Distance | −3048.7 | −1998.8 | −6010.2 |
| Effective Focal Length | 198.28 | 202.52 | 194.61 |
| Image Distance | 10.021 | 10.015 | 10.013 |
| Overall Length | 3391.4 | 2348.3 | 6346.5 |
| Forward Vertex Distance | 342.78 | 349.56 | 336.21 |
| Barrel Length | 332.76 | 339.55 | 326.20 |
| Stop Surface Number | 6 | 6 | 6 |
| Distance to Stop | 0.00 | 0.00 | 0.00 |
| Stop Diameter | 55.244 | 56.621 | 54.042 |
| Entrance Pupil Distance | 40.838 | 40.838 | 40.838 |
| Exit Pupil Distance | −2564.2 | −2859.8 | −2270.8 |

TABLE 1-continued

First Order Properties of Elements

| Element Number | Surface Numbers | Power | f' | lpp | l'pp |
|---|---|---|---|---|---|
| 1 | 1 2 | −0.70980E−02 | −140.88 | 5.1374 | −0.21047 |
| 2 | 3 4 | 0.18681E−01 | 53.532 | 8.2520 | −8.2520 |
| 3 | 4 5 | −0.88988E−02 | −112.38 | 0.20149 | −2.4261 |
| 4 | 7 8 | −0.10095E−01 | −99.059 | −2.6268 | −5.6025 |
| 5 | 9 10 | 0.29494E−02 | 339.06 | 35.393 | 26.063 |
| 6 | 11 12 | 0.57837E−02 | 172.90 | 21.342 | 1.8179 |
| 7 | 13 14 | 0.26604E−02 | 375.88 | −0.51716E−08 | −2.6778 |

First-Order Properties of Doublets

| Element Numbers | Surface Numbers | Power | f' | lpp | l'pp |
|---|---|---|---|---|---|
| 2 3 | 3 5 | 0.11187E−01 | 89.389 | 1.5277 | −16.542 |

First Order Properties of Groups

| Group Number | Surface Numbers | Power | f' | lpp | l'pp |
|---|---|---|---|---|---|
| 1 | 1 10 | −0.26248E−03 | −3809.7 | 495.35 | 349.41 |
| 2 | 11 12 | 0.57837E−02 | 172.90 | 21.342 | 1.8179 |
| 3 | 13 14 | 0.26604E−02 | 375.88 | −0.51716E−08 | −2.6778 |

First Order Properties of the Lens

| Zoom Position Number | Power | f' | lpp | l'pp |
|---|---|---|---|---|
| 1 | 0.50433E−02 | 198.28 | 223.78 | −199.63 |
| 2 | 0.49377E−02 | 202.52 | 228.97 | −211.76 |
| 3 | 0.51385E−02 | 194.61 | 218.81 | −189.07 |

TABLE 2

Lens Data

| Surf. No. | Type | Radius | Thickness | Glass | Clear Aperture Diameter |
|---|---|---|---|---|---|
| 1 | a | −3501.6551 | 8.00000 | ACRYLIC | 83.97 |
| 2 | a | 73.8047 | 10.00000 | | 72.07 |
| 3 | | 63.9262 | 25.00000 | SK18 | 69.86 |
| 4 | | −63.9262 | 4.00000 | KF6 | 67.04 |
| 5 | | 570.3825 | 2.53228 | | 60.39 |
| 6 | | ∞ | 41.97092 | | 59.72 |
| 7 | | −39.0852 | 5.00000 | SF14 | 64.45 |
| 8 | | −83.4350 | 1.00000 | | 80.90 |
| 9 | a | −77.4031 | 18.00000 | ACRYLIC | 83.88 |
| 10 | a | −57.0000 | 0.50000 | | 94.26 |
| 11 | c | −927.4539 | 30.50000 | ACRYLIC | 119.04 |
| 12 | a | −79.0000 | 194.22819 | | 124.60 |

Symbol Description a — Polynomial asphere
c — Conic section
Focal Shift = −1.97869

Conics

| Surface Number | Constant |
|---|---|
| 11 | −7.5322E+01 |

TABLE 2-continued

Even Polynomial Aspheres

| Surf. No. | D | E | F | G | H | I |
|---|---|---|---|---|---|---|
| 1 | −8.1680E−08 | −9.0415E−12 | −2.8846E−14 | 9.7292E−19 | 9.4877E−21 | −2.8507E−24 |
| 2 | 6.1549E−08 | 5.4266E−12 | 9.8518E−14 | −3.4835E−17 | −1.5392E−21 | 1.7744E−23 |
| 9 | 3.8615E−07 | 1.8759E−10 | 1.0984E−14 | 7.6281E−18 | 5.6048E−21 | −1.6720E−24 |
| 10 | 2.7112E−07 | 1.4686E−10 | 1.7530E−14 | 1.0200E−17 | 1.4695E−21 | 2.8348E−24 |
| 12 | 1.1260E−07 | 4.4374E−11 | −2.9777E−15 | 1.1981E−18 | 4.3134E−23 | −6.5187E−27 |

First-Order Data

| | | | |
|---|---|---|---|
| f/number | 3.50 | Overall Length | 3505.33 |
| Magnification | −0.0645 | Forward Vertex Distance | 340.731 |
| Object Height | −1830.8 | Barrel Length | 146.503 |
| Object Distance | −3164.60 | Entrance Pupil Distance | 40.9073 |
| Effective Focal Length | 198.998 | Exit Pupil Distance | −145.903 |
| Image Distance | 194.228 | Stop Diameter | 57.224 |
| Stop Surface Number | 6 | Distance to Stop | 6.43 |

First Order Properties of Elements

| Element Number | Surface Numbers | Power | f' | lpp | l'pp |
|---|---|---|---|---|---|
| 1 | 1 2 | −0.68364E−02 | −146.28 | 5.2411 | −0.11047 |
| 2 | 3 4 | 0.18530E−01 | 53.965 | 8.2460 | −8.2460 |
| 3 | 4 5 | −0.90617E−02 | −110.35 | 0.26468 | −2.3616 |
| 4 | 7 8 | −0.99405E−02 | −100.60 | −2.6199 | −5.5926 |
| 5 | 9 10 | 0.29494E−02 | 339.06 | 35.393 | 26.063 |
| 6 | 11 12 | 0.57859E−02 | 172.83 | 22.057 | 1.8788 |

First Order Properties of Doublet

| Element Numbers | Surface Numbers | Power | f' | lpp | l'pp |
|---|---|---|---|---|---|
| 2 3 | 3 5 | 0.10898E−01 | 91.762 | 1.1692 | −6.833 |

First Order Properties of the Lens

| Power | f' | lpp | l'pp |
|---|---|---|---|
| 0.50252E−02 | 199.00 | 119.64 | −15.627 |

FIRST ORDER DATA, SURF 1 TO 5

| K | PP1 | PP2 | f' |
|---|---|---|---|
| 0.490176E−02 | 30.3186 | −1.10148 | 204.00 |

FIRST ORDER DATA, SURF 7 TO 12

| K | PP1 | PP2 | f' |
|---|---|---|---|
| 0.232360E−02 | 147.569 | 172.803 | 430.37 |

TABLE 3

Lens Data

| Surf. No. | Type | Radius | Thickness | Glass | Clear Aperture Diameter |
|---|---|---|---|---|---|
| 1 | a | −148.4666 | 6.00000 | ACRYLIC | 51.92 |
| 2 | a | 54.4747 | 0.50000 | | 45.04 |
| 3 | | 40.0292 | 15.00000 | SK18 | 45.07 |
| 4 | | −130.3723 | 6.26676 | | 42.15 |
| 5 | | Aperture stop | 21.40605 | | 34.58 |
| 6 | | −23.1527 | 3.00000 | SF13 | 39.96 |
| 7 | | −64.2034 | 1.50000 | | 54.39 |
| 8 | | −54.0449 | 16.67610 | ACRYLIC | 54.69 |
| 9 | a | −35.8273 | 0.50000 | | 63.68 |
| 10 | a | −3465.3279 | 24.66862 | ACRYLIC | 93.09 |
| 11 | a | −54.7193 | 121.94030 | | 95.74 |

TABLE 3-continued

| | | | | | |
|---|---|---|---|---|---|
| 12 | cf | 120.0000 | 4.00000 | ACRYLIC | 166.79 |
| 13 | | ∞ | 9.99997 | | 166.48 |

Symbol Description a — Polynomial asphere
c — Conic section
f — Fresnel
Focal Shift = −1.94463

Conics

| Surface Number | Constant |
|---|---|
| 12 | −2.0085E+00 |

Even Polynomial Aspheres

| Surf. No. | D | E | F | G | H | I |
|---|---|---|---|---|---|---|
| 1 | −1.0532E−06 | −1.0364E−09 | 1.3079E−12 | −2.2637E−15 | 4.0754E−18 | −2.4681E−21 |
| 2 | −1.0077E−06 | 1.3853E−10 | −5.4208E−12 | 1.3555E−14 | −3.2354E−18 | −5.1055E−21 |
| 9 | −7.2513E−07 | 1.8571E−09 | −2.8477E−12 | 1.3532E−1S | 6.7032E−19 | −5.6155E−22 |
| 10 | −2.1332E−07 | 2.4887E−11 | 3.2458E−14 | 8.2905E−18 | 2.9285E−22 | −1.2661E−25 |
| 11 | 5.7413E−07 | 4.5720E−11 | 4.8259E−14 | 2.5315E−17 | −1.5472E−20 | 9.1310E−24 |

First-Order Data

| | | | |
|---|---|---|---|
| f/number | 3.50 | Overall Length | 1401.46 |
| Magnification | −0.1083 | Forward Vertex Distance | 231.458 |
| Object Height | −762.00 | Barrel Length | 221.458 |
| Object Distance | −1170.00 | Entrance Pupil Distance | 20.3913 |
| Effective Focal Length | 129.271 | Exit Pupil Distance | 5729.90 |
| Image Distance | 9.99997 | Stop Diameter | 34.576 |
| Stop Surface Number | 5 | Distance to Stop | 0.00 |

First Order Properties of Elements

| Element Number | Surface Numbers | Power | f' | lpp | l'pp |
|---|---|---|---|---|---|
| 1 | 1 2 | −0.12511E−01 | −79.928 | 2.9100 | −1.0677 |
| 2 | 3 4 | 0.20219E−01 | 49.458 | 2.2234 | −7.2414 |
| 3 | 6 7 | −0.19987E−01 | −50.032 | −0.99970 | −2.7722 |
| 4 | 8 9 | 0.60514E−02 | 165.25 | 25.425 | 16.855 |
| 5 | 10 11 | 0.89025E−02 | 112.33 | 16.739 | 0.26432 |
| 6 | 12 13 | 0.41148E−02 | 243.03 | −0.82019E−08 | −2.6778 |

First Order Properties of the Lens

| Power | f' | lpp | l'pp |
|---|---|---|---|
| 0.77357E−02 | 129.27 | 152.58 | −131.33 |

TABLE 4

Lens Data

| Surf. No. | Type | Radius | Thickness | Glass | Clear Aperture Diameter |
|---|---|---|---|---|---|
| 1 | a | −143.9480 | 6.00000 | ACRYLIC | 52.57 |
| 2 | a | 54.0933 | 0.50000 | | 46.45 |
| 3 | | 39.9766 | 15.00000 | SK18 | 47.01 |
| 4 | | −138.3967 | 6.26676 | | 44.55 |
| 5 | | ∞ | 23.26477 | | 37.09 |
| 6 | | −23.3945 | 3.00000 | SF13 | 41.34 |
| 7 | | −57.7517 | 1.50000 | | 55.58 |
| 8 | | −50.6040 | 16.57162 | ACRYLIC | 56.00 |
| 9 | a | −36.2946 | 0.50000 | | 64.89 |
| 10 | a | −2367.8999 | 24.39444 | ACRYLIC | 92.92 |
| 11 | a | −54.6713 | 134.17166 | | 95.59 |

TABLE 4-continued

Symbol Description a — Polynomial asphere
Focal Shift = −1.24114

Even Polynomial Aspheres

| Surf. No. | D | E | F | G | H | I |
|---|---|---|---|---|---|---|
| 1 | −7.8786E−07 | −7.4301E−10 | 1.2284E−12 | −2.6558E−15 | 3.7917E−18 | −1.8308E−21 |
| 2 | −4.9688E−07 | 6.2284E−10 | −5.5378E−12 | 1.2528E−14 | −4.7256E−18 | −2.2320E−21 |
| 9 | −6.7035E−07 | 1.6035E−09 | −2.8384E−12 | 1.4275E−15 | 6.5802E−19 | −6.1437E−22 |
| 10 | −2.4379E−07 | 2.3325E−11 | 3.2535E−14 | 8.2976E−18 | 2.0542E−22 | −2.1158E−25 |
| 11 | 6.0221E−07 | 5.9205E−11 | 4.6922E−14 | 2.3851E−17 | −1.6076E−20 | 8.9490E−24 |

First-Order Data

| | | | |
|---|---|---|---|
| f/number | 3.50 | Overall Length | 1473.17 |
| Magnification | −0.1083 | Forward Vertex Distance | 231.169 |
| Object Height | −762.00 | Barrel Length | 96.9976 |
| Object Distance | −1242.00 | Entrance Pupil Distance | 20.8429 |
| Effective Focal Length | 129.736 | Exit Pupil Distance | −136.607 |
| Iinage Distance | 134.172 | Stop Diameter | 36.897 |
| Stop Surface Number | 5 | Distance to Stop | 0.45 |

First Order Properties of Elements

| Element Number | Surface Numbers | Power | f' | lpp | l'pp |
|---|---|---|---|---|---|
| 1 | 1 2 | −0.12684E−01 | −78.838 | 2.8906 | −1.0862 |
| 2 | 3 4 | 0.19996E−01 | 50.010 | 2.1178 | −7.3318 |
| 3 | 6 7 | −0.18289E−01 | −54.677 | −1.2146 | −2.9983 |
| 4 | 8 9 | 0.53197E−02 | 187.98 | 28.371 | 20.349 |
| 5 | 10 11 | 0.88539E−02 | 112.94 | 16.659 | 0.38462 |

First Order Properties of the Lens

| Power | f' | lpp | l'pp |
|---|---|---|---|
| 0.77080E−02 | 129.74 | 85.332 | −8.3775 |

FIRST ORDER DATA, SURF 1 TO 4

| K | PP1 | PP2 | f' |
|---|---|---|---|
| 0.825105E−02 | 11.8672 | −1.63760 | 121.20 |

FIRST ORDER DATA, SURF 6 TO 11

| K | PP1 | PP2 | f' |
|---|---|---|---|
| 0.412919E−02 | 105.968 | 138.422 | 242.18 |

TABLE 5

Lens Data

| Surf. No. | Type | Radius | Thickness | Glass | Clear Aperture Diameter |
|---|---|---|---|---|---|
| 1 | a | −215.0838 | 6.00000 | ACRYLIC | 50.10 |
| 2 | a | 51.3941 | 0.50000 | | 44.84 |
| 3 | | 39.5202 | 15.00000 | SK18 | 45.08 |
| 4 | | −204.0199 | 6.26676 | | 41.86 |
| 5 | | ∞ | 24.70386 | | 37.34 |
| 6 | | −23.5819 | 3.00000 | SF13 | 42.80 |
| 7 | | −54.9838 | 17.48359 | SK5 | 58.11 |
| 8 | | −38.5513 | 0.50000 | | 68.16 |
| 9 | a | −442.7462 | 22.96924 | ACRYLIC | 93.18 |
| 10 | a | −54.6936 | 133.38308 | | 95.54 |

TABLE 5-continued

Symbol Description a — Polynomial asphere
Focal Shift = −1.06757

Even Polynomial Aspheres

| Surf. No. | D | E | F | G | H | I |
|---|---|---|---|---|---|---|
| 1 | −6.2558E−07 | −6.6007E−10 | 1.3377E−12 | −2.7764E−15 | 3.6207E−18 | −1.7047E−21 |
| 2 | −4.7729E−07 | 2.8390E−10 | −5.2520E−12 | 1.3608E−14 | −6.5024E−18 | −3.3618E−21 |
| 9 | −4.6643E−08 | 3.6819E−11 | 2.8968E−14 | 8.8163E−18 | 1.7148E−21 | 2.3288E−25 |
| 10 | 5.3589E−07 | 1.0862E−10 | 4.8657E−14 | 2.7503E−17 | −1.4201E−20 | 9.3743E−24 |

First-Order Data

| | | | |
|---|---|---|---|
| f/number | 3.50 | Overall Length | 1471.80 |
| Magnification | −0.1083 | Forward Vertex Distance | 229.807 |
| Object Height | −762.00 | Barrel Length | 96.4234 |
| Object Distance | −1241.99 | Entrance Pupil Distance | 19.6498 |
| Effective Focal Length | 129.598 | Exit Pupil Distance | −136.742 |
| Image Distance | 133.383 | Stop Diameter | 37.137 |
| Stop Surface Number | 5 | Distance to Stop | −0.86 |

First Order Properties of Elements

| Element Number | Surface Numbers | Power | f' | lpp | l'pp |
|---|---|---|---|---|---|
| 1 | 1 2 | −0.11992E−01 | −83.389 | 3.2180 | −0.76895 |
| 2 | 3 4 | 0.18904E−01 | 52.899 | 1.5196 | −7.8449 |
| 3 | 6 7 | −0.17354E−10 | −57.623 | −1.3444 | −3.1347 |
| 4 | 7 8 | 0.63978E−02 | 156.30 | 26.344 | 18.471 |
| 5 | 9 10 | 0.80676E−02 | 123.95 | 17.207 | 2.1256 |

First Order Properties of Doublets

| Element Numbers | Surface Numbers | Power | f' | lpp | l'pp |
|---|---|---|---|---|---|
| 3 4 | 6 8 | −0.76835E−02 | −130.15 | −25.890 | −48.110 |

First Order Properties of the Lens

| Power | f' | lpp | l'pp |
|---|---|---|---|
| 0.77162E−02 | 129.60 | 83.934 | −9.1868 |

FIRST ORDER DATA, SURF 1 TO 4

| K | PP1 | PP2 |
|---|---|---|
| 0.754490E−02 | 10.2057 | −3.41220 |

FIRST ORDER DATA, SURF 6 TO 10

| K | PP1 | PP2 |
|---|---|---|
| 0.446394E−02 | 93.0606 | 115.413 |

TABLE 6

Lens Data

| Surf. No. | Type | Radius | Thickness | Glass | Clear Aperture Diameter |
|---|---|---|---|---|---|
| 1 | a | 94.4760 | 15.00000 | STYRENE | 42.78 |
| 2 | a | −528.9612 | 0.50000 | | 37.32 |
| 3 | | ∞ | 21.29889 | | 36.84 |
| 4 | | −27.7690 | 3.00000 | STYRENE | 40.46 |
| 5 | a | −407.8987 | 4.00000 | | 53.21 |
| 6 | | −74.3345 | 12.15783 | BK7 | 53.55 |
| 7 | | −42.4453 | 0.50000 | | 61.02 |

TABLE 6-continued

| 8 | a | 164.4718 | 26.97190 | ACRYLIC | 92.86 |
| 9 | a | −62.3055 | 135.01787 | | 95.37 |

Symbol Description a — Polynomial asphere
Focal Shift = −0.74200

Even Polynomial Aspheres

| Surf. No. | D | E | F | G | H | I |
|---|---|---|---|---|---|---|
| 1 | −2.1948E−07 | −3.1161E−09 | 7.4142E−12 | −1.0377E−14 | −2.2299E−17 | 3.2858E−20 |
| 2 | −1.5111E−06 | −5.1899E−09 | −8.6485E−12 | 2.3336E−14 | 2.8430E−17 | −1.0133E−19 |
| 5 | −3.9131E−07 | −6.8333E−10 | 5.5582E−13 | 6.5433E−16 | 1.3386E−20 | −7.1347E−22 |
| 8 | −2.9686E−07 | −3.7064E−12 | 9.5859E−15 | 4.9355E−18 | 1.5459E−21 | 5.8285E−25 |
| 9 | 5.6173E−07 | 1.1183E−10 | 1.3209E−14 | 1.5832E−17 | −1.7718E−20 | 7.9237E−24 |

First-Order Data

| f/number | 3.50 | Overall Length | 1460.42 |
| Magnification | −0.1083 | Forward Vertex Digtance | 218.446 |
| Object Height | −762.00 | Barrel Length | 83.4286 |
| Object Distance | −1241.97 | Entrance Pupil Distance | 14.3855 |
| Effective Focal Length | 128.370 | Exit Pupil Distance | −110.515 |
| Image Distance | 135.018 | Stop Diameter | 35.707 |
| Stop Surface Number | 3 | Distance to Stop | 3.27 |

First Order Properties of Elements

| Element Number | Surface Numbers | Power | f' | lpp | l'pp |
|---|---|---|---|---|---|
| 1 | 1 2 | 0.73555E−02 | 135.95 | 1.4381 | −8.0518 |
| 2 | 4 5 | −0.19908E−01 | −50.232 | −0.13781 | −2.0243 |
| 3 | 6 7 | 0.59254E−02 | 168.76 | 16.511 | 9.4276 |
| 4 | 8 9 | 0.10498E−01 | 95.259 | 13.631 | −5.1638 |

First Order Properties of the Lens

| Power | f' | lpp | l'pp |
|---|---|---|---|
| 0.77900E−02 | 128.37 | 71.383 | −7.9999 |

FIRST ORDER DATA, SURF 4 TO 9

| K | PP1 | PP2 |
|---|---|---|
| 0.444232E−02 | 92.8040 | 107.813 |

TABLE 7

| Ex. No. | Unit 1 Surf. Nos. | Unit 2 Surf. Nos. | f1 | f2 | f | f1/f2 |
|---|---|---|---|---|---|---|
| 1 | 1 to 5 | 7 to 12 | 199.16 | 448.33* | 198.99* | 0.444 |
| 2 | 1 to 5 | 7 to 12 | 204.00 | 430.37 | 199.00 | 0.474 |
| 3 | 1 to 4 | 6 to 11 | 115.38 | 257.84* | 129.60* | 0.447 |
| 4 | 1 to 4 | 6 to 11 | 121.20 | 242.18 | 129.74 | 0.500 |
| 5 | 1 to 4 | 6 to 10 | 132.56 | 224.02 | 129.60 | 0.592 |
| 6 | 1 to 2 | 4 to 9 | 135.95 | 225.11 | 128.37 | 0.604 |

*Value calculated without the Fresnel lens since the Fresnel lens is primarily a field lens which serves to couple the lens' entrance pupil to the exit pupil of the illumination system. As such, the Fresnel lens has a minimal effect on the overall focal length of the lens, but a large effect on the value of f2, which effect is not representative of the actual functioning of the f2 unit.

What is claimed is:

1. A projection lens for forming an image of an object, said lens having an aperture stop and consisting in order from its image end to its object end of:
   (a) a first lens unit having a positive optical power and a focal length f1;
   (b) a second lens unit having a positive optical power and a focal length f2;
   wherein the aperture stop is located between the first and second lens units, f1 is shorter than f2, and the lens has a back focal length approximately equal to the lens' focal length.

2. The projection lens of claim 1 wherein the second lens unit has a negative lens element at its image end.

3. The projection lens of claim 1 wherein said lens has a focal length f and f1/f is less than or equal to 1.1.

4. The projection lens of claim 3, 1, or 2 wherein the ratio of f1 to f2 is less than about 0.75.

5. The projection lens of claim 3, 1 or 2 wherein each of the first and second lens units has at least one aspherical surface.

6. The projection lens of claim 3, 1 or 2 wherein the first lens unit consists of a single positive lens element.

7. The projection lens of claim 3, 1 or 2 wherein the first lens unit comprises in order from its image end:
   (a) a negative lens element; and
   (b) a positive lens subunit.

8. The projection lens of claim 7 wherein the positive lens subunit is spaced from the negative lens element by a distance which is less than or equal to 5% of f1.

9. The projection lens of claim 8 wherein the second lens unit comprises a color correcting doublet and a positive lens element which has at least one aspherical surface.

10. The projection lens of claim 7 wherein the second lens unit comprises a color correcting doublet and a positive lens element which has at least one aspherical surface.

11. The projection lens of claim 7 wherein the positive lens subunit is a color correcting doublet.

12. The projection lens of claim 11 wherein the second lens unit comprises a color correcting doublet and a positive lens element which has at least one aspherical surface.

13. The projection lens of claim 3, 1, or 2 wherein the second lens unit comprises a color correcting doublet and a positive lens element which has at least one aspherical surface.

14. A projection lens system for forming an image of an object, said system comprising:
 (a) an illumination system comprising a light source and illumination optics which forms an image of the light source;
 (b) a pixelized panel which comprises the object; and
 (c) the projection lens of claim 3, 1, or 2.

15. The projection lens system of claim 14 further comprising a field lens between the pixelized panel and the projection lens.

16. The projection lens of claim 2 wherein the lens has a focal length f and f1/f is less than or equal to 1.1.

\* \* \* \* \*